US006122384A

United States Patent [19]
Mauro

[11] Patent Number: 6,122,384
[45] Date of Patent: Sep. 19, 2000

[54] NOISE SUPPRESSION SYSTEM AND METHOD

[75] Inventor: Anthony P. Mauro, San Diego, Calif.

[73] Assignee: Qualcomm Inc., San Diego, Calif.

[21] Appl. No.: 08/921,492

[22] Filed: Sep. 2, 1997

[51] Int. Cl.[7] .................................................. H04B 15/00
[52] U.S. Cl. ........................ 381/94.3; 381/94.1; 381/94.2
[58] Field of Search .............................. 381/94; 704/200, 704/210, 217, 233, 214, 215, 225

[56] References Cited

U.S. PATENT DOCUMENTS

| | | | |
|---|---|---|---|
| 4,628,529 | 12/1986 | Borth et al. | 381/94 |
| 4,630,304 | 12/1986 | Borth et al. | 381/94 |
| 4,630,305 | 12/1986 | Borth et al. | 381/94 |
| 4,811,404 | 3/1989 | Vilmur et al. | 381/94.3 |
| 5,341,456 | 8/1994 | DeJaco | 704/214 |
| 5,432,859 | 7/1995 | Yang et al. | 381/94.3 |
| 5,544,250 | 8/1996 | Urbanski | 381/94 |
| 5,757,937 | 5/1998 | Itoh et al. | 381/94.3 |
| 5,920,834 | 7/1999 | Sih et al. | 704/233 |

*Primary Examiner*—Forester W. Isen
*Assistant Examiner*—Brian Tyrone Pendleton
*Attorney, Agent, or Firm*—Philip Wadsworth; Thomas R. Rouse; Kyong H. Macek

[57] ABSTRACT

A system and method for noise suppression in a speech processing system is presented. A gain estimator determines the gain, and thus the level of noise suppression, for each frame of the input signal. If no speech is present in the frame, then the gain is set at a predetermined minimum. If speech is present in the frame, then a gain factor is determined for each channel of a predefined set of frequency channels. For each channel, the gain factor is a function of the SNR of speech in the channel. The channel SNRs are generated by a SNR estimator based on channel energy estimates provided by an energy estimator and channel noise energy estimates provided by a noise energy estimator. The noise energy estimator updates its estimates during frames in which no speech is present, as determined by a speech detector.

32 Claims, 3 Drawing Sheets

NOISE SUPPRESSION SYSTEM AND METHOD

BACKGROUND OF THE INVENTION

I. Field of the Invention

The present invention relates to speech processing. More particularly, the present invention relates to a noise suppression system and method for use in speech processing.

II. Description of the Related Art

Transmission of voice by digital techniques has become widespread, particularly in cellular telephone and personal communication system (PCS) applications. This, in turn, has created an interest in improving speech processing techniques. One area in which improvements are being developed is that of noise suppression techniques.

Noise suppression in a speech communication system generally serves the purpose of improving the overall quality of the desired audio signal by filtering environmental background noise from the desired speech signal. This speech enhancement process is particularly necessary in environments having abnormally high levels of ambient background noise, such as an aircraft, a moving vehicle, or a noisy factory.

One noise suppression technique is the spectral subtraction, or spectral gain modification, technique. Using this approach, the input audio signal is divided into frequency channels, and particular frequency channels are attenuated according to their noise energy content. A background noise estimate for each frequency channel is utilized to generate a signal-to-noise ratio (SNR) of the speech in the channel, and the SNR is used to compute a gain factor for each channel. The gain factor then determines the attenuation for the particular channel. The attenuated channels are recombined to produce the noise-suppressed output signal.

In specialized applications involving relatively high background noise environments, most noise suppression techniques exhibit significant performance limitations. One example of such an application is the vehicle speakerphone option to a cellular mobile communication system. The speakerphone option provides hands-free operation for the automobile driver. The hands-free microphone is typically located at a greater distance from the user, such as being mounted overhead on the visor. The distant microphone delivers a poor SNR to the land-end party due to road and wind noise conditions. Although the received speech at the land-end is usually intelligible, continuous exposure to such background noise levels often increases listener fatigue.

For a noise suppression system to function properly, it is important to accurately determine the SNR of speech. However, it is difficult to accurately determine the SNR for the speech signal because of the limitations of currently available noise detectors. Spectral subtraction techniques update the background noise estimate during periods when speech is absent. When speech is absent, the measured spectral energy is attributed to noise, and the noise estimate is updated based on the measured spectral energy. Therefore, it is important to distinguish between periods of speech and absence of speech in order to obtain an accurate noise energy estimate for computation of the SNR.

An exemplary technique for speech detection uses a voice metric calculator to perform the noise update decision. A voice metric is a measurement of the overall voice-like characteristics of the channel energy. First, raw SNR estimates are used to index a voice metric table to obtain voice metric values for each channel. The individual channel voice metric values are summed to create an energy parameter, which is compared with a background noise update threshold. If the voice metric sum meets or exceeds the threshold, then the signal is said to contain speech. If the voice metric sum does not meet the threshold, the input frame is deemed to be noise, and a background noise update is performed. However, for the case of a high background noise condition, a sudden background noise, or an increasing noise source, SNR measurements will be large, resulting in a high voice metric, which negates a noise estimate update.

A refinement to the voice metric calculator technique measures the channel energy deviation. This method assumes that noise exhibits constant spectral energy over time, while speech exhibits variable spectral energy over time. Thus, the channel energy is integrated over time, and speech is detected if there is substantial channel energy deviation, while noise is detected if there is little channel energy deviation. A speech detector which measures channel energy deviation will detect a sudden increase in the level of noise. However, the channel energy deviation method provides an inaccurate result when the input speech signal is of constant energy. Furthermore, for the case of an increasing noise source, changes in the input energy will cause the energy deviation to be large, negating a noise estimate update even though an update is necessary.

In addition to an accurate speech detector, the noise suppression system must appropriately adjust channel gains. Channel gains should be adjusted so that noise suppression is achieved without sacrificing the voice quality. One method of channel gain adjustment computes the gain as a function of the total noise estimate and the SNR of the speech signal. In general, an increase in the total noise estimate results in a lower gain factor for a given SNR. A lower gain factor is indicative of a greater attenuation factor. This technique imposes a minimum gain value to prevent excess attenuation of the channel gain when the total noise estimate is very high. By using a hard clamped minimum gain value, a tradeoff between noise suppression and voice quality is introduced. When the clamp is relatively low, noise suppression is improved but voice quality is degraded. When the clamp is relatively high, noise suppression is degraded but the voice quality is improved.

In order to provide an improved noise suppression system, the limitations of the current techniques for speech detection and channel gain computation need to be addressed. These problems and deficiencies are solved by the present invention in the manner described below.

SUMMARY OF THE INVENTION

The present invention is a noise suppression system and method for use in speech processing systems. An objective of the present invention is to provide a speech detector which determines the presence of speech in an input signal. A reliable speech detector is needed for an accurate determination of the signal-to-noise ratio (SNR) of speech. When speech is determined to be absent, the input signal is assumed to be entirely a noise signal, and the noise energy may be measured. The noise energy is then used for determination of the SNR. Another objective of the present invention is to provide an improved gain determination element for realization of noise suppression.

In accordance with the present invention, the noise suppression system comprises a speech detector which determines if speech is present in a frame of the input signal. The speech decision may be based on the SNR measure of speech in an input signal. A SNR estimator estimates the SNR based on the signal energy estimate generated by an energy estimator and the noise energy estimate generated by a noise energy estimator. The speech decision may also be based on the encoding rate of the input signal. In a variable rate communication system, each input frame is assigned an encoding rate selected from a predetermined set of rates based on the content of the input frame. Generally, the rate is dependent on the level of speech activity, so that a frame containing speech would be assigned a high rate, whereas a frame not containing speech would be assigned a low rate. Further, the speech decision may be based on one or more mode measures which are descriptive of the characteristics of the input signal. If it is determined that speech is not present in the input frame, then the noise energy estimator updates the noise energy estimate.

A channel gain estimator determines the gain for the frame of input signal. If speech is not present in the frame, then the gain is set to be a predetermined minimum. Otherwise, the gain is determined based on the frequency content of the frame. In a preferred embodiment, a gain factor is determined for each of a set of predefined frequency channels. For each channel, the gain is determined in accordance with the SNR of the speech in the channel. For each channel, the gain is defined using a function that is suitable for the characteristics of the frequency band within which the channel is located. Typically, for a predefined frequency band, the gain is set to increase linearly with increasing SNR. Additionally, the minimum gain for each frequency band may be adjustable based on the environmental characteristics. For example, a user-selectable minimum gain may be implemented. The channel SNRs are based on channel energy estimates generated by an energy estimator and channel noise energy estimates generated by a noise energy estimator. The gain factors are used to adjust the gain of the signal in the different channels, and the gain adjusted channels are combined to produce the noise suppressed output signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In speech communication systems, noise suppressors are commonly used to suppress undesirable environmental background noise. Most noise suppressors operate by estimating the background noise characteristics of the input data signal in one or more frequency bands and subtracting an average of the estimate(s) from the input signal. The estimate of the average background noise is updated during periods of the absence of speech. Noise suppressors require an accurate determination of the background noise level for proper operation. In addition, the level of noise suppression must be properly adjusted based on the speech and noise characteristics of the input signal. These requirements are addressed by the noise suppression system of the present invention.

Figure 1:
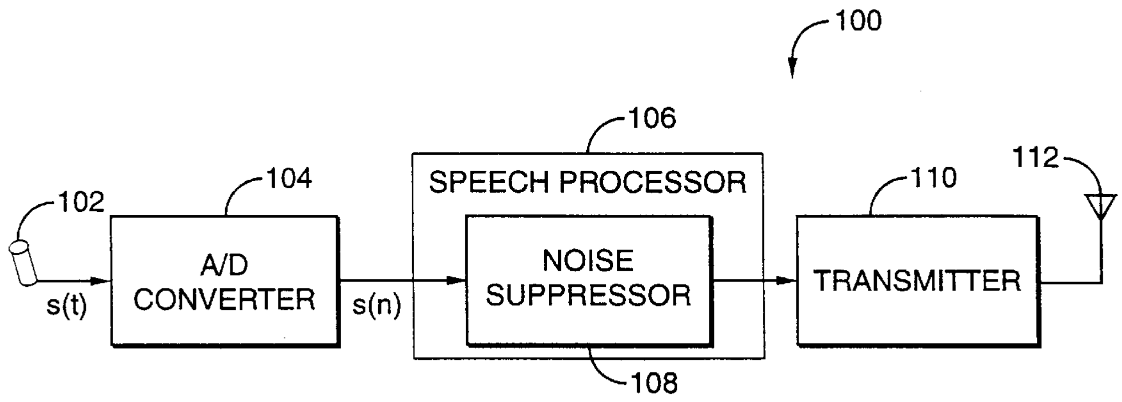
FIG. 1 is a block diagram of a communications system in which a noise suppressor is utilized.

An exemplary speech processing system 100 in which the present invention may be embodied is illustrated in FIG. 1. System 100 comprises microphone 102, A/D converter 104, speech processor 106, transmitter 110, and antenna 112. Microphone 102 may be located in a cellular telephone together with the other elements illustrated in FIG. 1. Alternatively, microphone 102 may be the hands-free microphone of the vehicle speakerphone option to a cellular communication system. The vehicle speakerphone assembly is sometimes referred to as a carkit. Where microphone 102 is part of a carkit, the noise suppression function is particularly important. Because the hands-free microphone is generally positioned at some distance from the user, the received acoustic signal tends to have a poor speech SNR due to road and wind noise conditions.

Referring still to FIG. 1, the input audio signal, comprising speech and/or background noise, is received by microphone 102. The input audio signal is transformed by microphone 102 into an electro-acoustic signal represented by the term s(t). The electro-acoustic signal may be converted from an analog signal to pulse code modulated (PCM) samples by Analog-to-Digital converter 104. In an exemplary embodiment, PCM samples are output by A/D converter 104 at 64 kbps and are represented by signal s(n) as shown in FIG. 1. Digital signal s(n) is received by speech processor 106, which comprises, among other elements, noise suppressor 108. Noise suppressor 108 suppresses noise in signal s(n) in accordance with the present invention. In a carkit application, noise suppressor 108 determines the level of background environmental noise and adjusts the gain of the signal to mitigate the effects of such environmental noise. In addition to noise suppressor 108, speech processor 106 generally comprises a voice coder, or a vocoder (not shown), which compresses speech by extracting parameters that relate to a model of human speech generation. Speech processor 106 may also comprise an echo canceller (not shown), which eliminates acoustic echo resulting from the feedback between a speaker (not shown) and microphone 102.

Following processing by speech processor 106, the signal is provided to transmitter 110, which performs modulation in accordance with a predetermined format such as Code Division Multiple Access (CDMA), Time Division Multiple Access (TDMA), or Frequency Division Multiple Access (FDMA). In the exemplary embodiment, transmitter 110 modulates the signal in accordance with a CDMA modulation format as described in U.S. Pat. No. 4,901,307, entitled “SPREAD SPECTRUM MULTIPLE ACCESS COMMUNICATION SYSTEM USING SATELLITE OR TERRESTRIAL REPEATERS,” which is assigned to the assignee of the present invention and incorporated by reference herein. Transmitter 110 then upconverts and amplifies the modulated signal, and the modulated signal is transmitted through antenna 112.

It should be recognized that noise suppressor 108 may be embodied in speech processing systems that are not identical to system 100 of FIG. 1. For example, noise suppressor 108 may be utilized within an electronic mail application having a voice mail option. For such an application, transmitter 110 and antenna 112 of FIG. 1 will not be necessary. Instead, the noise suppressed signal will be formatted by speech processor 106 for transmission through the electronic mail network.

Figure 2:
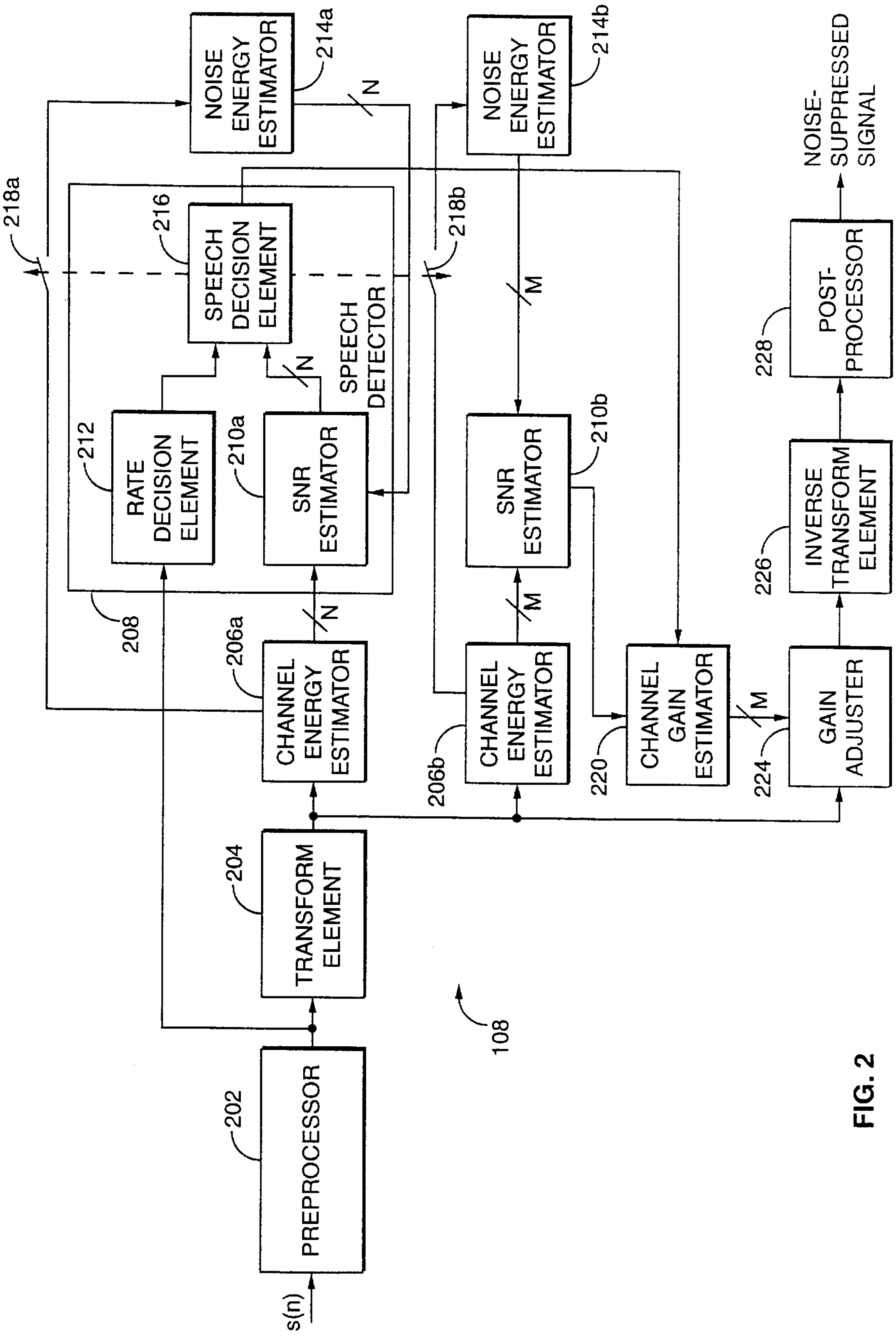
FIG. 2 is a block diagram illustrating a noise suppressor in accordance with the present invention.

An exemplary embodiment of noise suppressor 108 is illustrated in FIG. 2. The input audio signal is received by preprocessor 202, as shown in FIG. 2. Preprocessor 202 prepares the input signal for noise suppression by performing preemphasis and frame generation. Preemphasis redistributes the power spectral density of the speech signal by emphasizing the high frequency speech components of the signal. Essentially performing a high pass filtering function, preemphasis emphasizes the important speech components to enhance the SNR of these components in the frequency domain. Preprocessor 202 may also generate frames from the samples of the input signal. In a preferred embodiment, 10 ms frames of 80 samples/frame are generated. The frames may have overlapped samples for better processing accuracy. The frames may be generated by windowing and zero padding of the samples of the input signal. The preprocessed signal is presented to transform element 204. In a preferred embodiment, transform element 204 generates a 128 point Fast Fourier Transform (FFT) for each frame of input signal. It should be understood, however, that alternative schemes may be used to analyze the frequency components of the input signal.

The transformed components are provided to channel energy estimator 206*a*, which generates an energy estimate for each of N channels of the transformed signal. For each channel, one technique for updating the channel energy estimates the update to be the current channel energy smoothed over channel energies of previous frames as follows:

$$E_u(t)=\alpha E_{ch}+(1-\alpha)E_u(t-1), \quad (1)$$

where the updated estimate, $E_u(t)$, is defined as a function of the current channel energy, $E_{ch}$, and the previous estimated channel noise energy, $E_u(t-1)$. An exemplary embodiment sets $\alpha=0.55$.

A preferred embodiment determines an energy estimate for a low frequency channel and an energy estimate for a high frequency channel, so that N=2. The low frequency channel corresponds to frequency range from 250 to 2250 Hz, while the high frequency channel corresponds to frequency range from 2250 to 3500 Hz. The current channel energy of the low frequency channel may be determined by summing the energy of the FFT points corresponding to 250–2250 Hz, and the current channel energy of the high frequency channel may be determined by summing the energy of the FFT points corresponding to 2250–3500 Hz.

The energy estimates are provided to speech detector 208, which determines whether or not speech is present in the received audio signal. SNR estimator 210*a* of speech detector 208 receives the energy estimates. SNR estimator 210*a* determines the signal-to-noise ratio (SNR) of the speech in each of the N channels based on the channel energy estimates and the channel noise energy estimates. The channel noise energy estimates are provided by noise energy estimator 214*a*, and generally correspond to the estimated noise energy smoothed over the previous frames which do not contain speech.

Speech detector 208 also comprises rate decision element 212, which selects the data rate of the input signal from a predetermined set of data rates. In certain communication systems, data is encoded so that the data rate may be varied from one frame to another. This is known as a variable rate communication system. The voice coder which encodes data based on a variable rate scheme is typically called a variable rate vocoder. An exemplary embodiment of a variable rate vocoder is described in U.S. Pat. No. 5,414,796, entitled "VARIABLE RATE VOCODER," assigned to the assignee of the present invention and incorporated by reference herein. The use of a variable rate communications channel eliminates unnecessary transmissions when there is no useful speech to be transmitted. Algorithms are utilized within the vocoder for generating a varying number of information bits in each frame in accordance with variations in speech activity. For example, a vocoder with a set of four rates may produce 20 millisecond data frames containing 16, 40, 80, or 171 information bits, depending on the activity of the speaker. It is desired to transmit each data frame in a fixed amount of time by varying the transmission rate of communications.

Because the rate of a frame is dependent on the speech activity during a time frame, determining the rate will provide information on whether speech is present or not. In a system utilizing variable rates, a determination that a frame should be encoded at the highest rate generally indicates the presence of speech, while a determination that a frame should be encoded at the lowest rate generally indicates the absence of speech. Intermediate rates typically indicate transitions between the presence and the absence of speech.

Rate decision element 212 may implement any of a number of rate decision algorithms. One such rate decision algorithm is disclosed in copending U.S. Pat. No. 5,911,128, entitled "METHOD AND APPARATUS FOR PERFORMING REDUCED RATE VARIABLE RATE VOCODING," issued Jun. 8, 1999 assigned to the assignee of the present invention and incorporated by reference herein. This technique provides a set of rate decision criteria referred to as mode measures. A first mode measure is the target matching signal to noise ratio (TMSNR) from the previous encoding frame, which provides information on how well the encoding model is performing by comparing a synthesized speech signal with the input speech signal. A second mode measure is the normalized autocorrelation function (NACF), which measures periodicity in the speech frame. A third mode measure is the zero crossings (ZC) parameter, which measures high frequency content in an input speech frame. A fourth measure, the prediction gain differential (PGD), determines if the encoder is maintaining its prediction efficiency. A fifth measure is the energy differential (ED), which compares the energy in the current frame to an average frame energy. Using these mode measures, a rate determination logic selects an encoding rate for the frame of input.

It should be understood that although rate decision element 212 is shown in FIG. 2 as an included element of noise suppressor 108, the rate information may instead be provided to noise suppressor 108 by another component of speech processor 106 (FIG. 1). For example, speech processor 106 may comprise a variable rate vocoder (not shown) which determines the encoding rate for each frame of input signal. Instead of having noise suppressor 108 independently perform rate determination, the rate information may be provided to noise suppressor 108 by the variable rate vocoder.

It should also be understood that instead of using the rate decision to determine the presence of speech, speech detector 208 may use a subset of the mode measures that contribute to the rate decision. For instance, rate decision element 212 may be substituted by a NACF element (not shown), which, as explained earlier, measures periodicity in the speech frame. The NACF is evaluated in accordance with the relationship below:

$$NACF = \frac{\max_{T\in[t_1,t_2]}\left\{\sum_{n=0}^{N-1} e(n)\cdot e(n-T)\right\}}{0.5\cdot\sum_{n=0}^{N-1}\{e^2(n)+e^2(n-T)\}} \quad (2)$$

where N refers to the numbers of samples of the speech frame, t1 and t2 refer to the boundaries within the T samples for which the NACF is evaluated. The NACF is evaluated based on the format residual signal, e(n). Format frequencies are the resonance frequencies of speech. A short term filter is used to filter the speech signal to obtain the format frequencies. The residual signal obtained after filtering by the short term filter is the format residual signal, and contains the long term speech information, such as the pitch, of the signal.

The NACF mode measure is suitable for determining the presence of speech because the periodicity of a signal containing voiced speech is different from a signal which does not contain voiced speech. A voiced speech signal tends to be characterized by periodic components. When voiced speech is not present, the signal generally will not have periodic components. Thus, the NACF measure is a good indicator which may be used by speech detector 208.

Speech detector 208 may use measures such as the NACF instead of the rate decision in situations where it is not practicable to generate the rate decision. For example, if the rate decision is not available from the variable rate vocoder, and noise processor 108 does not have the processing power to generate its own rate decision, then mode measures like the NACF offer a desirable alternative. This may be the case in a carkit application where processing power is generally limited.

Additionally, it should be understood that speech detector 208 may make a determination regarding the presence of speech based on the rate decision, the mode measure(s), or the SNR estimate alone. Although additional measures should improve the accuracy of the determination, any one of the measures alone may provide an adequate result.

The rate decision (or the mode measure(s)) and the SNR estimate generated by SNR estimator 210*a* are provided to speech decision element 216. Speech decision element 216 generates a decision on whether or not speech is present in the input signal based on its inputs. The decision on the presence of speech will determine if a noise energy estimate update should be performed. The noise energy estimate is used by SNR estimator 210*a* to determine the SNR of the speech in the input signal. The SNR will in turn will be used to compute the level of attenuation of the input signal for noise suppression. If it is determined that speech is present, then speech decision element 216 opens switch 218*a*, preventing noise energy estimator 214*a* from updating the noise energy estimate. If it is determined that speech is not present, then the input signal is assumed to be noise, and speech decision element 216 closes switch 218*a*, causing noise energy estimator 214*a* to update the noise estimate. Although shown in FIG. 2 as switch 218*a*, it should be understood that an enable signal provided by speech decision element 216 to noise energy estimator 214*a* may perform the same function.

In a preferred embodiment in which two channel SNRs are evaluated, speech decision element 216 generates the noise update decision based on the procedure below:

```
if (rate == min)
    if ((chsnrl > T1) OR (chsnr2 > T2))
        if (ratecount > T3)
            update noise estimate
        else
            ratecount ++
    else
        update noise estimate
        ratecount = 0
else
    ratecount = 0
```

The channel SNR estimates provided by SNR estimator 210*a* are denoted by chsnr1 and chsnr2. The rate of the input signal, provided by rate decision element 212, is denoted by rate. A counter, ratecount, keeps track of the number of frames based on certain conditions as described below.

Speech decision element 216 determines that speech is not present, and that the noise estimate should be updated, if the rate is the minimum rate of the variable rates, either chsnrl is greater than threshold T1 or chsnr2 is greater than threshold T2, and ratecount is greater than threshold T3. If the rate is minimum, and either chsnr1 is greater than T1 or chsnr2 is greater than T2, but ratecount is less than T3, then the ratecount is increased by one but no noise estimate update is performed. The counter, ratecount, detects the case of a sudden increased level of noise or an increasing noise source by counting the number of frames having minimum rate but also having high energy in at least one of the channels. The counter, which provides an indicator that the high SNR signal contains no speech, is set to count until speech is detected in the signal. A preferred embodiment sets T1=T2=5 dB, and T2=100 frames where 10 ms frames are evaluated.

If the rate is minimum, chsnr1 is less than T1, and chsnr2 is less than T2, then speech decision element 216 will determine that speech is not present and that a noise estimate update should be performed. In addition, ratecount is reset to zero.

If the rate is not minimum, then speech decision element 216 will determine that the frame contains speech, and no noise estimate update is performed, but ratecount is reset to zero.

Instead of using the rate measure to determine the presence of speech, recall that mode measures such as a NACF measure may be utilized instead. Speech decision element 216 may make use of the NACF measure to determine the presence of speech, and thus the noise update decision, in accordance with the procedure below:

```
if (pitchPresent == FALSE)
    if ((chsnrl > TH1) OR (chsnr2 > TH2))
        if (pitchCount > TH3)
            update noise estimate
        else
            pitchCount ++
    else
        update noise estimate
        pitchCount = 0
else
    pitchCount = 0
where pitchPresent is defined as follows:
if (NACF > TT1)
    pitchPresent = TRUE
    NACFcount = 0
elseif (TT2 ≦ NACF ≦ TT1)
```

-continued

```
        if (NACFcount> TT3)
        pitchPresent = TRUE
    else
        pitchPresent = FALSE
        NACFcount ++
    else
        pitchPresent = FALSE
        NACFcount = 0
```

Again, channel SNR estimates provided by SNR estimator 210*a* are denoted by chsnr1 and chsnr2. A NACF element (not shown) generates a measure indicative of the presence of pitch, pitchpresent, as defined above. A counter, pitchCount, keeps track of the number of frames based on certain conditions as described below.

The measure pitchPresent determines that pitch is present if NACF is above threshold TT1. If NACF falls within a mid range (TT2≦NACF≦TT1) for a number of frames greater than threshold TT3, then pitch is also determined to be present. A counter, NACFcount, keeps track of the number of frames for which TT2≦NACF≦TT1. In a preferred embodiment, TT1=0.6, TT2=0.4, and TT3=8 frames where 10 ms frames are evaluated.

Speech decision element 216 determines that speech is not present, and that the noise estimate should be updated, if the pitchPresent measure indicates that pitch is not present (pitchPresent=FALSE), either chsnr1 is greater than threshold TH1 or chsnr2 is greater than threshold TH2, and pitchCount is greater than threshold TH3. If pitchPresent= FALSE, and either chsnr1 is greater than TH1 or chsnr2 is greater than TH2, but pitchCount is less than TH3, then pitchCount is increased by one but no noise estimate update is performed. The counter, pitchCount, is used to detect the case of a sudden increased level of noise or an increasing noise source. A preferred embodiment sets T1=T2=5 dB, and T2=100 frames where 10 ms frames are evaluated.

If pitchPresent indicates that pitch is not present, and chsnrl is less than TH1 and chsnr2 is less than TH2, then speech decision element 216 will determine that speech is not present and that a noise estimate update should be performed. In addition, pitchCount is reset to zero.

If pitchPresent indicates that pitch is present (pitchPresent=TRUE), then speech decision element 216 will determine that the frame contains speech, and no noise estimate update is performed. However, pitchCount is reset to zero.

Upon determination that speech is not present, switch 218*a* is closed, causing noise energy estimator 214*a* to update the noise estimate. Noise energy estimator 214*a* generally generates a noise energy estimate for each of the N channels of the input signal. Since speech is not present, the energy is presumed to be wholly contributed by noise. For each channel, the noise energy update is estimated to be the current channel energy smoothed over channel energies of previous frames which do not contain speech. For example, the updated estimate may be obtained based on the relationship below:

$$E_n(t)=\beta E_{ch}+(1-\beta)E_n(t-1), \quad (3)$$

where the updated estimate, $E_n(t)$, is defined as a function of the current channel energy, $E_{ch}$, and the previous estimated channel noise energy, $E_n(t-1)$. An exemplary embodiment sets β=0.1. The updated channel noise energy estimates are presented to SNR estimator 210*a*. These channel noise energy estimates will be used to obtain channel SNR estimate updates for the next frame of input signal.

The determination regarding the presence of speech is also provided to channel gain estimator 220. Channel gain estimator 220 determines the gain, and thus the level of noise suppression, for the frame of input signal. If speech decision element 216 has determined that speech is not present, then the gain for the frame is set at a predetermined minimum gain level. Otherwise, the gain is determined as a function of frequency. In a preferred embodiment, the gain is computed based on the graph shown in FIG. 3. Although shown in graphical form in FIG. 3, it should be understood that the function illustrated in FIG. 3 may be implemented as a look-up table in channel gain estimator 220.

Figure 3:
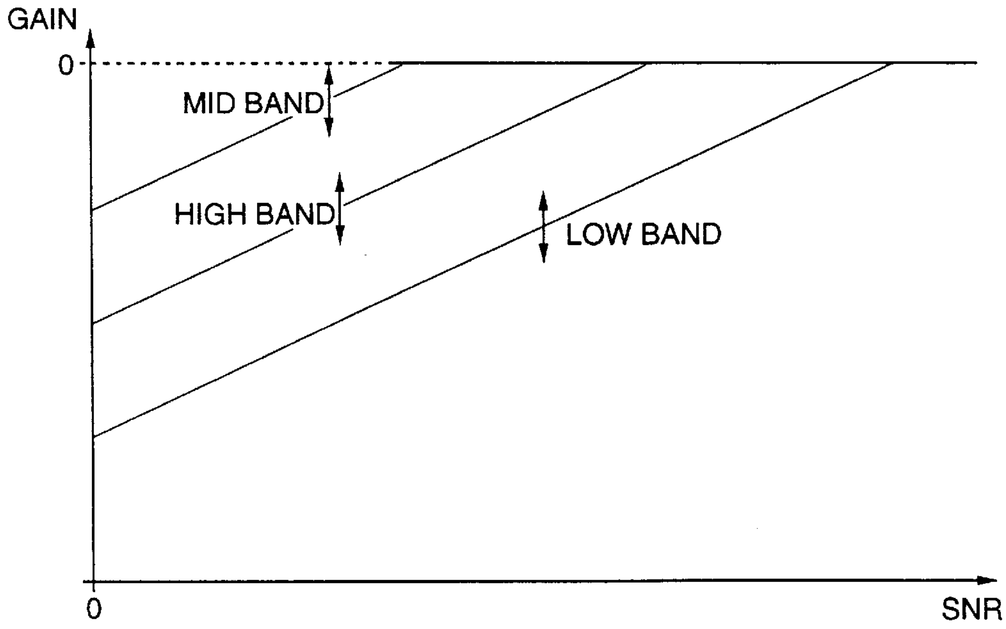
FIG. 3 is a graph of gain factors based on frequency, for realization of noise suppression in accordance with the present invention.

Referring to FIG. 3, it can be seen that a preferred embodiment of the present invention defines a separate gain curve for each of L frequency bands. In FIG. 3, three bands (L=3) are represented, although L may be any number greater than or equal to one. Thus, the gain factor for a channel in the low band may be determined using the low band curve, the gain factor for a channel in the mid band may be determined using the mid band curve, and the gain factor for a channel in the high band may be determined using the high band curve.

Although noise suppression may be performed by utilizing just one gain curve for the input signal (L=1), the use of multiple bands has been found to provide less voice quality degradation. In the case of environmental noise, such as road and wind noise, the energy of the noise signal is greater at the lower frequencies, and the energy generally decreases with increasing frequency.

In FIG. 3, a line equation with a fixed slope and a y-intercept is used to determine the gain factor for each band. Determination of the gain factors may be described by the following relationships:

gain[low band](dB)=slope1* SNR+lowBandYintercept; (4)

gain[mid band](dB)=slope2* SNR+midBandYintercept; (5)

gain[high band](dB)=slope3* SNR+highBandYintercept. (6)

The preferred embodiment assigns the low band as 125–375 Hz, the mid band as 375–2625 Hz, and the high band as 2625–4000 Hz. The slopes and the y intercepts are experimentally determined. The preferred embodiment uses the same slope, 0.39, for each of the three bands, although a different slope may be used for each frequency band. Also, lowBandYintercept is set at −17 dB, midBandYintercept is set at −13 dB, and highBandYintercept is set at −13 dB.

An optional feature would provide the user of the device comprising the noise suppressor to select the desired y-intercepts. Thus, more noise suppression (a lower y-intercept) may be chosen at the expense of some voice degradation. Alternatively, the y-intercepts may be variable as a function of some measure determined by noise suppressor 108. For example, more noise suppression (a lower y-intercept) may be desired when an excessive noise energy is detected for a predetermined period of time. Alternatively, less noise suppression (a high y-intercept) may be desired when a condition such as babble is detected. During a babble condition, background speakers are present, and less noise suppression may be warranted to prevent cut out of the main speaker. Another optional feature would provide for selectable slopes of the gain curves. Further, it should be understood that a curve other than the lines described by equations (4)–(6) may be found to be more suitable for determining the gain factor under certain circumstances.

For each frame containing speech, a gain factor is determined for each of M frequency channels of the input signal, where M is the predetermined number of channels to be evaluated. A preferred embodiment evaluates sixteen channels (M=16). Referring again to FIG. 3, the gain factors for the channels having frequency components in the range of the low band are determined using the low band curve. The gain factors for the channels having frequency components in the range of the mid band are determined using the mid band curve. The gain factors for the channels having frequency components in the range of the high band are determined using the high band curve.

For each channel evaluated, the channel SNR is used to derive the gain factor based on the appropriate curve. The channel SNRs are shown, in FIG. 2, to be evaluated by channel energy estimator 206*b*, noise energy estimator 214*b*, and SNR estimator 210*b*. For each frame of input signal, channel energy estimator 206*b* generates energy estimates for each of M channels of the transformed input signal, and provides the energy estimates to SNR estimator 210*b*. The channel energy estimates may be updated using the relationship of Equation (1) above. If it is determined by speech decision element 216 that no speech is present in the input signal, then switch 218*b* is closed, and noise energy estimator 214*b* updates the estimates of the channel noise energy. For each of the M channels, the updated noise energy estimate is based on the channel energy estimate determined by channel energy estimator 206*b*. The updated estimate may be evaluated using the relationship of Equation (3) above. The channel noise estimates are provided to SNR estimator 210*b*. Thus, SNR estimator 210*b* determines channel SNR estimates for each frame of speech based on the channel energy estimates for the particular frame of speech and the channel noise energy estimates provided by noise energy estimator 214*b*.

An artisan skilled in the art would recognize that channel energy estimator 206*a*, noise energy estimator 214*a*, switch 218*a*, and SNR estimator 210*a* perform functions similar to channel energy estimator 206*b*, noise energy estimator 214*b*, switch 218*b*, and SNR estimator 210*b*, respectively. Thus, although shown as separate processing elements in FIG. 2, channel energy estimators 206*a* and 206*b* may be combined as one processing element, noise energy estimators 214*a* and 214*b* may be combined as one processing element, switches 218*a* and 218*b* may be combined as one processing element, and SNR estimators 210*a* and 210*b* may be combined as one processing element. As combined elements, the channel energy estimator would determine channel energy estimates for both the N channels used for speech detection and the M channels used for determining channel gain factors. Note that it is possible for N=M. Likewise, the noise energy estimator and the SNR estimator would operate on both the N channels and the M channels. The SNR estimator then provides the N SNR estimates to speech decision element 216, and provides the M SNR estimates to channel gain estimator 220.

The channel gain factors are provided by channel gain estimator 220 to gain adjuster 224. Gain adjuster 224 also receives the FFT transformed input signal from transform element 204. The gain of the transformed signal is appropriately adjusted according to the channel gain factors. For example, in the embodiment described above wherein M=16, the transformed (FFT) points belonging to the particular one of the sixteen channels are adjusted based on the appropriate channel gain factor.

The gain adjusted signal generated by gain adjuster 224 is then provided to inverse transform element 226, which in a preferred embodiment generates the Inverse Fast Fourier Transform (IFFT) of the signal. The inverse transformed signal is provided to post processing element 228. If the frames of input had been formed with overlapped samples, then post processing element 228 adjusts the output signal for the overlap. Post processing element 228 also performs deemphasis if the signal had undergone preemphasis. Deemphasis attenuates the frequency components that were emphasized during preemphasis. The preemphasis/deemphasis process effectively contributes to noise suppression by reducing the noise components lying outside of the range of the processed frequency components.

It should be understood that the various processing blocks of the noise suppressor shown in FIG. 2 may be configured in a digital signal processor (DSP) or an application specific integrated circuit (ASIC). The description of the functionality of the present invention would enable one of ordinary skill to implement the present invention in a DSP or an ASIC without undue experimentation.

Figure 4:
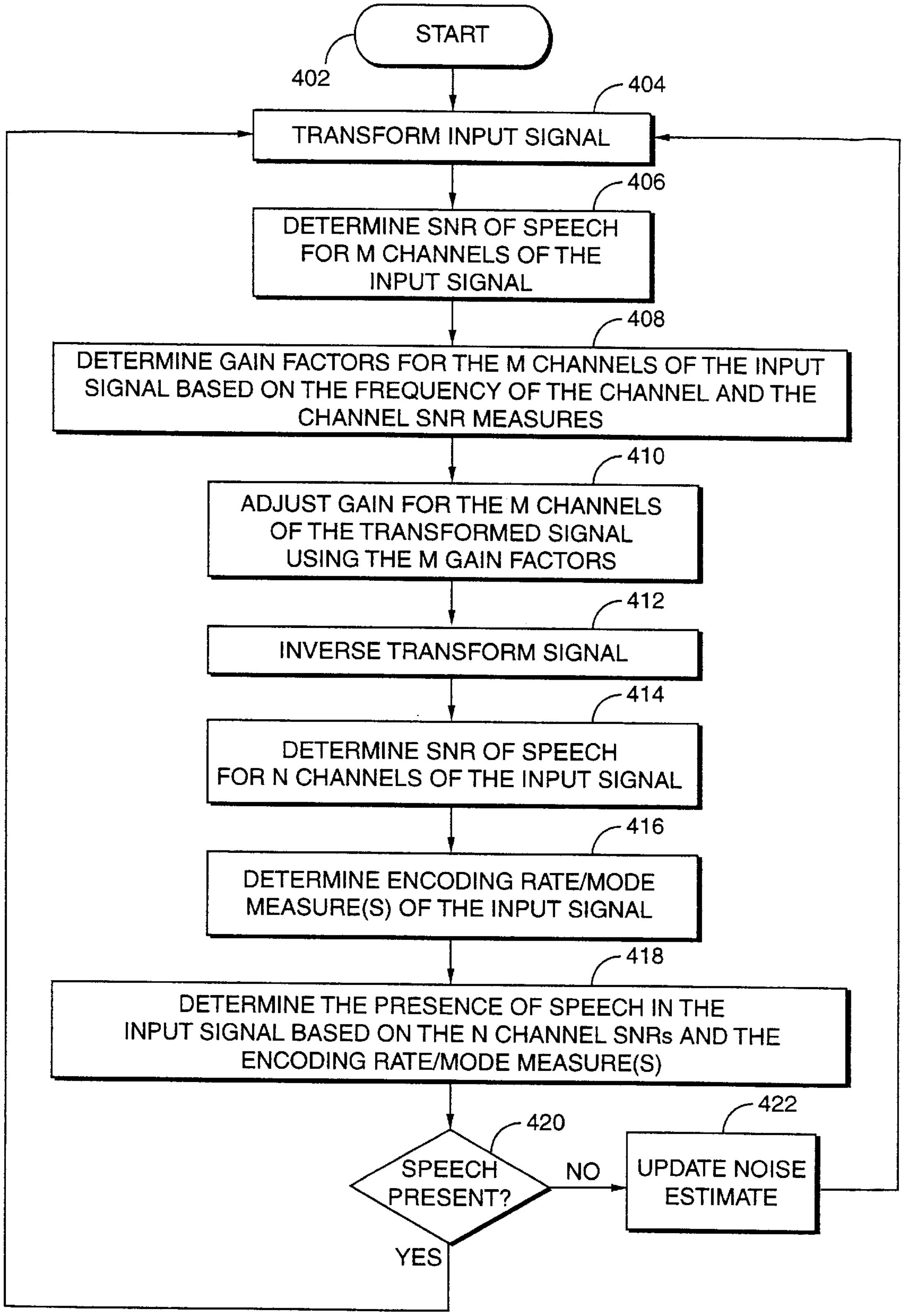
FIG. 4 is a flow chart illustrating an exemplary embodiment of the processing steps involved in noise suppression as implemented by the processing elements of FIG. 2.

Referring now to FIG. 4, a flow chart is shown illustrating some of the steps involved in the processing as discussed with reference to FIGS. 2 and 3. Although shown as consecutive steps, one skilled in the art would recognize that ordering of some of the steps are interchangeable.

The process begins at step 402. At step 404, transform element 204 transforms the input audio signal into a transformed signal, generally a FFT signal. At step 406, SNR estimator 210*b* determines the speech SNR for M channels of the input signal based on the channel energy estimates provided by channel energy estimator 206*b* and the channel noise energy estimates provided by noise energy estimator 214*b*. At step 408, channel gain estimator 220 determines gain factors for the M channels of the input signal based on the frequency of the channels. Channel gain estimator 220 sets the gain at a minimum level if speech has been found to be absent in the frame of input signal. Otherwise, a gain factor is determined, for each of the M channels, based on a predetermined function. For example, referring to FIG. 3, a function defined by line equations having fixed slopes and y-intercepts, wherein each line equation defines the gain for a predetermined frequency band, may be used. At step 410, gain adjuster 224 adjusts the gain of the M channels of the transformed signal using the M gain factors. At step 412, inverse transform element 226 inverse transforms the gain adjusted transformed signal, producing the noise suppressed audio signal.

At step 414, SNR estimator 210*a* determines the speech SNR for N channels of the input signal based on the channel energy estimates provided by channel energy estimator 206*a* and the channel noise energy estimates provided by noise energy estimator 214*a*. At step 416, rate decision element 212 determines the encoding rate for the input signal through analysis of the input signal. Alternatively, one or more mode measures, such as the NACF, may be determined. At step 418, speech decision element 216 determines if speech is present in the input signal based on the SNR provided by SNR estimator 210*a*, the rate provided by rate decision element 212, and/or the mode measure(s). If it is determined, at decision block 420, that speech is not present, then the input signal is assumed to be entirely noise, and a noise estimate update is performed by noise energy estimator 214*a* at step 422. Noise energy estimator 214*a* updates the noise estimate based on the channel energy determined by channel energy estimator 206*a*. Whether or not speech is detected, the procedure continues to process the next frame of the input signal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A noise suppressor for suppressing the background noise of an audio signal, comprising:

a signal to noise ratio (SNR) estimator for generating channel SNR estimates for a first predefined set of frequency channels of said audio signal;

a gain estimator for generating a gain factor for each of said frequency channels based on a corresponding one of said channel SNR estimates, wherein said gain factor is derived using a gain function which defines gain factor as an increasing function of SNR;

a gain adjuster for adjusting the gain level of each of said frequency channels based on said corresponding gain factor; and a speech detector for determining the presence of speech in said audio signal, wherein said speech detector uses the SNR estimator and a rate decision element to detect the presence of speech.

2. The noise suppressor of claim 1 wherein said gain function is frequency dependent.

3. The noise suppressor of claim 1 wherein said gain function is implemented as a look-up table.

4. The noise suppressor of claim 1 wherein said gain function is a linear function having a slope and a y-intercept.

5. The noise suppressor of claim 4 wherein said y-intercept is user selectable.

6. The noise suppressor of claim 4 wherein said y-intercept is adjustable based on the measured characteristics of noise in said audio signal.

7. The noise suppressor of claim 4 wherein said slope is user selectable.

8. The noise suppressor of claim 4 wherein said slope is adjustable based on the measured characteristics of noise in said audio signal.

9. The noise suppressor of claim 1, further comprising a noise energy estimator for generating an updated channel noise energy estimate for each of said frequency channels when said speech detector determines that speech is not present in said audio signal, said updated channel noise energy estimates provided to said SNR estimator for generating said channel SNR estimates.

10. The noise suppressor of claim 9 wherein said speech detector comprises:

a signal to noise ratio (SNR) estimator for generating channel SNR estimates for a second predefined set of frequency channels of said audio signal; and a speech decision element for determining the presence of speech in accordance with said channel SNR estimates for said second set of frequency channels.

11. The noise suppressor of claim 10 wherein said speech detector further comprises:

a mode measurement element for determining at least one mode measure characterizing said audio signal;

wherein said speech decision element determines the presence of speech further in accordance with said at least one mode measure.

12. The noise suppressor of claim 11 wherein said mode measures comprise a normalized autocorrelation function (NACF) measure.

13. A noise suppressor for suppressing the background noise of an audio signal, comprising:

means for detecting an encoding rate associated with said audio signal, wherein said audio signal is already encoded in accordance with the encoding rate;

means for determining the presence of speech in said audio signal in accordance with the encoding rate;

means for generating channel signal to noise ratio (SNR) estimates for a predefined set of frequency channels of said audio signal;

means for determining a gain factor for each of said frequency channels if said means for determining the presence of speech determines that speech is present, wherein a gain function is defined for each of a set of frequency bands, and for each said frequency band, gain factor is defined to increase with increasing SNR, so that for each of said frequency channels, a channel gain factor is determined based on the gain function for the frequency band whose range contains the frequency channel; and means for adjusting the gain level of each of said frequency channels based on said corresponding channel gain factor.

14. The noise suppressor of claim 13 wherein said means for determining a gain factor determines a minimum gain factor for each of said frequency channels if said means for determining the presence of speech determines that speech is not present.

15. The noise suppressor of claim 13 wherein said gain functions are implemented as a look-up table.

16. The noise suppressor of claim 13 wherein each of said gain functions is a linear function having a slope and a y-intercept.

17. The noise suppressor of claim 16 wherein each said y-intercept is user-selectable.

18. The noise suppressor of claim 16 wherein each said y-intercept is adjustable based on the measured characteristics of noise in said audio signal.

19. The noise suppressor of claim 16 wherein each said slope is user-selectable.

20. The noise suppressor of claim 16 wherein each said slope is adjustable based on the measured characteristics of noise in said audio signal.

21. The noise suppressor of claim 13, further comprising:

means for generating an updated channel noise energy estimate for each of said frequency channels when said means for determining the presence of speech determines that speech is not present in said audio signal, said updated channel noise energy estimates provided to means for generating SNR estimates for updating said channel SNR estimates.

22. A noise suppressor of claim 13 wherein said means for determining the presence of speech further comprises means for generating SNR estimates for a second predefined set of frequency channels of said audio signal.

23. The noise suppressor of claim 13 wherein said means for determining the presence of speech comprises:

means for determining at least one mode measure characterizing said audio signal; and means for making a decision regarding the presence of speech in accordance with said at least one mode measure.

24. The noise suppressor of claim 23 wherein said means for determining the presence of speech further comprises:

means for generating SNR estimates for a second predefined set of frequency channels of said audio signal;

wherein said means for making a decision regarding the presence of speech makes the decision further in accordance with said SNR estimates.

25. The noise suppressor of claim 23 wherein said mode measures comprise a normalized autocorrelation function (NACF) measure.

26. A method for suppressing the background noise of an audio signal, comprising the steps of:

transforming said audio signal into a frequency representation of said audio signal;

detecting an encoding rate associated with said audio signal;

determining the presence of speech in said audio signal from the encoding rate of said audio signal;

generating channel signal to noise ratio (SNR) estimates for a predefined set of frequency channels of said frequency representation;

determining a gain factor for each of said frequency channels if speech is determined to be present in said audio signal, wherein a gain function is defined for each of a set of frequency bands, and for each said frequency band, gain is defined to increase with increasing SNR, so that for each of said frequency channels, a channel gain factor is determined based on the gain function for the frequency band whose range contains the frequency channel;

adjusting the gain level of each of said frequency channels based on said corresponding channel gain factor; and inverse transforming said gain adjusted frequency representation to generate a noise suppressed audio signal.

27. The method of claim 26 further comprising the step of:

determining a minimum gain factor for each of said frequency channels if speech is determined to be absent in said audio signal.

28. The method of claim 26 wherein each of said gain functions is a linear function having a slope and a y-intercept.

29. The method of claim 26 further comprising the step of:

generating an updated channel noise energy estimate for each of said frequency channels when said step of determining the presence of speech determines that speech is absent in said audio signal, said updated channel noise energy estimates to be used for generating said channel SNR estimates.

30. The method of claim 26 wherein said step of determining the presence of speech comprises the steps of:

generating channel SNR estimates for a second predefined set of frequency channels of said audio signal; and deciding on the presence of speech in accordance with said channel SNR estimates for said second set of frequency channels.

31. The method of claim 30 wherein said step of determining the presence of speech further comprises the steps of:

determining at least one mode measure characterizing said audio signal; and deciding on the presence of speech further in accordance with said at least one mode measure.

32. The method of claim 31 wherein said mode measures comprise a normalized autocorrelation function (NACF) measure.

* * * * *